United States Patent
Roche et al.

(12)

(10) Patent No.: US 6,890,671 B2
(45) Date of Patent: May 10, 2005

(54) FUEL MIXING CONTROL FOR FUEL CELL POWER PLANTS OPERATING ON MULTIPLE FUELS

(75) Inventors: Robert P. Roche, Cheshire, CT (US); Paul R. Margiott, South Windsor, CT (US); John C. Trocciola, Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 188 days.

(21) Appl. No.: 10/324,454

(22) Filed: Dec. 19, 2002

(65) Prior Publication Data

US 2004/0121201 A1 Jun. 24, 2004

(51) Int. Cl.⁷ .................................. H01M 8/06
(52) U.S. Cl. ............................ 429/17; 429/2; 429/13; 429/19; 429/38; 429/39
(58) Field of Search ................... 429/2, 12, 13, 429/17, 19, 22, 34, 38, 39

(56) References Cited

U.S. PATENT DOCUMENTS 3,745,047 A   7/1973 Fanciullo et al. ......... 136/86 B
5,009,967 A   4/1991 Scheffler ................... 429/23
2004/0023086 A1 * 2/2004 Su et al. .................... 429/17

* cited by examiner

*Primary Examiner*—Michael Barr
*Assistant Examiner*—Monique Wills
(74) *Attorney, Agent, or Firm*—Stephen A. Schneeberger (57) ABSTRACT

Fuel mixing control arrangements are provided for fuel cell power plants (10) operating on multiple fuels (22, 24, 26). A fuel delivery system (16) supplies hydrogen-rich fuel (20) to the cell stack assembly (CSA) (12) after controlled mixing of a primary fuel (22) and at least a secondary fuel (24), each having a respective "equivalent hydrogen ($H_2$) content". The relative amounts of the primary fuel (22) and secondary fuel (24) mixed are regulated (18, 34, 36) to provide at least a minimum level (LL) of hydrogen-rich fuel having an equivalent hydrogen content sufficient for normal operation of the CSA (12). The primary fuel (22) is a bio-gas or the like having a limited, possibly variable, equivalent $H_2$ content, and the secondary fuel (22) has a greater and relatively constant equivalent H2 content and is mixed with the primary fuel in an economic, constant relationship that assures adequate performance of the CSA (12). One or more parameters (IDC, P, V, E. C.) of the operating power plant (10) related to the equivalent $H_2$ content of at least the primary fuel may be sensed (72, 26, 78, 84, 176) and used to control (18, 36) the relative amounts of secondary and primary fuels (22, 24) mixed in response thereto.

19 Claims, 5 Drawing Sheets

FUEL MIXING CONTROL FOR FUEL CELL POWER PLANTS OPERATING ON MULTIPLE FUELS

TECHNICAL FIELD

This invention relates to fuel cell power plants, and more particularly to fueling such fuel cell power plants. More particularly still, the invention relates to the operation of fuel cell power plants from multiple fuel sources.

BACKGROUND ART

The fuel cell stack assembly(ies) of most fuel cell power plants is fueled by hydrogen, or a hydrogen-rich fuel. The sources of such hydrogen are numerous and may include derivation from water, as by hydrolysis, or from solid storage, as from hydrides, but the most common forms are via hydrogen-rich gasses. Perhaps the most common source is from the hydrogen contained in the hydrogen-rich methane (CH4) of natural gas. Other hydrocarbons, such as propane, butane, methanol, ethanol, and various petroleum derivatives, including reformulated gasoline, are also good sources of hydrogen. Still further, other types of organic materials may be processed, as by active digestion and/or natural decomposition, to yield hydrogen-rich fuels, typically grouped as bio-gasses. An example of this latter fuel source is the active digestion of various types of plant and/or animal waste, such as bagasse and the like, via an anaerobic digester to provide "anaerobic digester gas" (ADG), which has a useful content of hydrogen ($H_2$) in the form of methane. Land-fill gas is an example of a bio-gas resulting from natural decomposition, and having a usable $H_2$ (methane) content.

Typically, most or all of the aforementioned sources of hydrogen require some degree of fuel processing at the fuel cell power plant to provide the desired hydrogen-rich fuel stream for the fuel cell stack assembly, and to remove or convert undesirable carbon compounds, such as carbon monoxide. Moreover, while each of the aforementioned fuel sources has a useful hydrogen content, it may vary considerably from one fuel type to another, and in some instances, even within the same fuel type. For example, the hydrogen content of natural gas, as methane, may be relatively high and constant, compared to that of, for instance, bio-gasses, such as ADG and the like, with the latter being even more variable as the result of changes in the feedstock being digested, the temperature of the digestor(s), solids content in the water, etc. Other bio-gasses such as land-fill gas may have an even lower hydrogen content.

Historically, most fuel cell power plants have been designed to operate with a single, particular one of the aforementioned sources of hydrogen-rich fuel, as determined by various factors including performance, availability, and cost of fuel. More recently, some fuel cell power plants have been designed to operate alternately from one or another of multiple fuel sources. Indeed, the 200 kw UTC Fuel Cells PC25™ fuel cell power plant offers the ability for its included fuel processing system (FPS) to accept and process multiple fuel sources, either exclusively or as a blend or mix, as depicted generally in the functional system schematic of FIG. 1.

Figure 1:
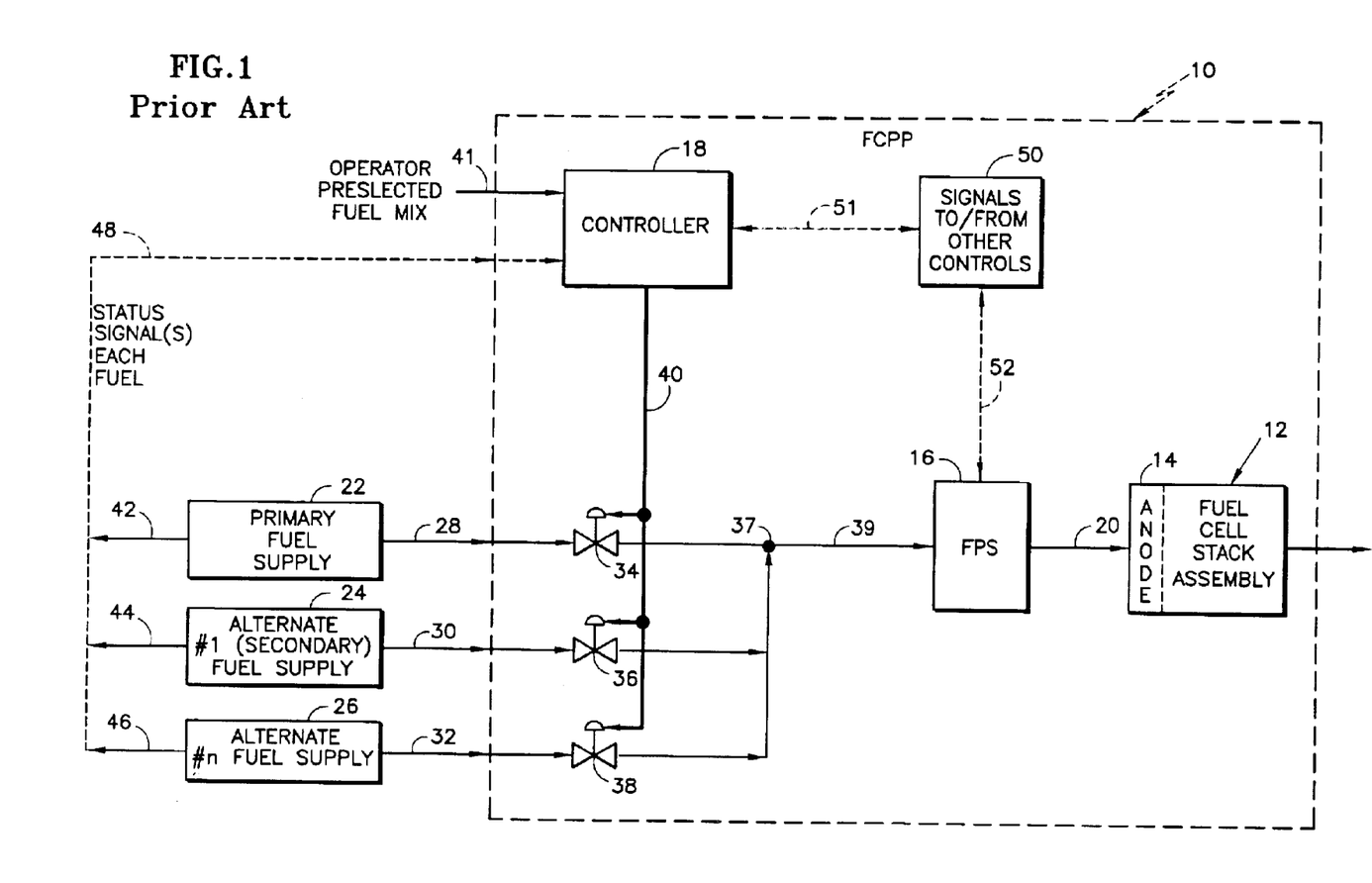
FIG. 1 is a generalized, functional system schematic of a fuel cell power plant in accordance with the prior art, depicting capability for using multiple fuels either separately or mixed.

Referring to FIG. 1, a fuel cell power plant 10 includes a fuel cell stack assembly (CSA) 12, a fuel processing system (FPS) 16, and a controller 18, as well as other components (not shown). The FPS 16 may typically include components of known design for reforming the raw fuel to separate the hydrogen, as by reforming, and for further reacting the reformate, as by shift conversion and/or selective oxidation, to reduce the CO level and relatively increase the $H_2$ level in the fuel stream. The CSA 12 includes an anode 14 that receives a hydrogen-rich fuel stream, via conduit 20 from the FPS 16, for use in the well-known electrochemical reaction(s) that convert the fuel reactant and an oxidant reactant to electrical energy. Multiple fuel sources of different types are represented by at least Primary fuel supply 22 and Alternate #1 fuel supply 24, and may further include Alternate #n fuel supply 26 to represent one or more further fuel sources. Each of the fuel sources 22, 24, and 26 is connected to the FPS 16 via a respective conduit 28, 30 and 32 that contains a respective control valve 34, 36 and 38. The conduits 28, 30, and 32 typically merge downstream of the control valves 34, 36, and 38 at a mixing junction 37 to mix or blend the fuel, and the mixed fuel is then conducted to the FPS 16 via conduit 39. Independent control of each of the control valves 34, 36 and 38 by controller 18 is represented, for simplicity in this Figure, by a single line 40, which may in fact be separate, independent control leads to each valve or may be a single lead for conveying multiplexed signals to the appropriate valves. The controller 18 may be discrete circuitry, a programmable computer, or a combination thereof, and provides control for at least the portions of the power plant 10 associated with fuel delivery and fuel processing. An operator-pre-selected fuel mix value for controller 18, expressed as a percentage of the alternate fuel(s), is represented by control input line 41 to the controller 18, which in turn is operative to control the valves 34, 36, 38 to provide the pre-selected relative percentages of the fuels to be mixed. Typically, the standard (i.e. primary) fuel has been natural gas, with the alternate fuel being another fuel as mentioned above. The operator either selected 0% of the alternate fuel, 100% of the alternate fuel, or a mix comprising some specified percentage of the alternate fuel and the remainder being natural gas. Further, lines 42, 44, and 46, extending via lead 48 (shown in broken line) to controller 18, indicate the status of the respective fuel supplies 22, 24, 26, but typically only in a 2-state fashion, such as on or off, or available or unavailable. The broken-line function block 50 represents signals to and from other controls (not shown), and conducted via the lines 51 and 52 shown in broken-line form.

Although the system described above with reference to FIG. 1 has the capability to use alternate fuels, either separately or in some pre-selected mixed combination, the particular selection of fuels and the scheme for determining their relative amounts has not been addressed. Moreover, there is no suggestion of accommodating variations in the hydrogen content of the fuels during operation. In this latter regard, if the hydrogen content of one or more of the fuels in a mix of multiple fuel sources is sufficiently variable during operation, failure to accommodate or compensate for such variation may cause the CSA 12 to shut down or reduce power in the event the hydrogen content is too low during a "variation".

At this point it will be noted that while it is the hydrogen content of the fuel stream that is of ultimate concern, it will be convenient to refer to fuels, or fuel components, that have an "equivalent" hydrogen content. For instance, the methane in natural gas is a good source of hydrogen and has a relatively constant equivalent hydrogen content. Similarly, other hydrogen-source fuels have respective equivalent hydrogen contents, though as noted above they may be variable. Indeed, that equivalent hydrogen content may even be expressed as "energy content", particularly when referring to the heating value of a fuel. For the purposes of the description I the present application, while it is ultimately the hydrogen content of the fuel that is of importance, reference may be made herein to a specific fuel, such as natural gas, ADG, methane or the like, for which there is an "equivalent" hydrogen content, either known or unknown, constant or variable. In such instance, reference to a particular fuel is intended to be a reference to the equivalent hydrogen (equivalent $H_2$) content of that fuel.

For example, the fuel cell power plant 10 described above typically requires a hydrogen content or level that corresponds with at least a 60% methane level in the fuel source(s) in order to maintain full power. If the hydrogen content in the raw fuel is in a form other than methane, such as propane, butane, methanol, etc., then the required level may be other than the 60% methane equivalent and may or may not be expressed as a methane equivalent, but will nevertheless ultimately be characterized and quantified by its equivalent hydrogen content. In any event, this may be of particular concern for ADG and other bio-gasses, which have a relatively low and variable methane, and thus $H_2$, content. While there may be significant advantages, such as cost, etc., to the use of ADG as the sole fuel source, the aforementioned limitations may preclude that. Alternatively, the use of another fuel source in combination with the ADG continues to present some problems because of the uncertainty of the actual level of equivalent $H_2$ content of the ADG at any particular time. This latter problem exists with respect to any combination of fuel sources where the $H_2$ equivalent content of at least one of the fuels is not known and/or is variable. In that same regard, it may be desirable to mix two or more fuels so as to minimize usage of one of the fuels for reasons of cost, carbon minimization, etc., and the variability of $H_2$ content of at least one of the mixed fuels impedes an effective utilization.

Accordingly, it is a principal object of the invention to provide an arrangement in a fuel cell power plant for mixing fuels in a manner that provides normal reliable operation of the fuel cell assembly, such as cost effectiveness, minimization of carbon formation, and/or others.

It is a further object of the invention to provide a control arrangement for mixing fuels in a variable manner to accommodate and/or automatically adjust for, hydrogen content of the fuel.

DISCLOSURE OF INVENTION

According to the invention, there is provided, in a fuel cell power plant having a fuel cell stack assembly (CSA) and a fuel delivery system for supplying a hydrogen-rich fuel to the CSA, the fuel delivery system including fuel blending means for mixing at least a primary fuel and a secondary fuel and control means for regulating the relative amounts of the primary and secondary fuels mixed to provide the hydrogen-rich fuel, an improved method of and apparatus for regulating the relative amounts of the primary fuel and the secondary fuel mixed so as to provide at least a minimum level of energy, or hydrogen, content to the hydrogen-rich fuel sufficient for normal operation of the CSA. It is also preferred to concurrently limit the use of the secondary fuel relative to the primary fuel. This is particularly applicable to situations in which the "cost" of the primary fuel is relatively less than the "cost" of secondary fuel(s), as for instance when the primary fuel is a bio-gas, such as anaerobic digester gas (ADG), and the secondary gas is natural gas. As used herein, "cost" is to be broadly construed to include not only direct price, but also other factors such as availability, environmental desirability, political considerations, etc. that collectively contribute to the attractiveness of a particular fuel.

In one embodiment, wherein the primary fuel is a bio-gas such as ADG or the like, having a methane content, and thus equivalent $H_2$ content, that is variable and relatively less than that of the secondary fuel, which may be natural gas, the primary and secondary fuels are mixed in a predetermined, fixed relationship that assures sufficient equivalent hydrogen content to continuously operate the CSA, while minimizing the use of the secondary fuel. More specifically, a worst-case, lower limit actual methane (equivalent hydrogen) content is determined, or estimated, for the primary fuel; the more-constant actual methane (equivalent hydrogen) content of the secondary fuel is determined or estimated; a minimum acceptable methane (equivalent hydrogen) level, or range, for operating the CSA is established; and the primary and secondary fuels are mixed in a relationship that assures that the lowest methane (equivalent hydrogen) content of the mixed fuels is at, or slightly greater than, the minimum acceptable methane (equivalent $H_2$) level for continuous satisfactory operation. In the example of the primary gas being ADG, the secondary gas being natural gas, and the fuel cell power plant being a PC 25™ as described above, the presumed worst-case lower limit of methane content for the ADG is about 50%, the natural gas is presumed to have a methane content of about 95%, and 60% methane is about the lower limit for satisfactory operation of the power plant. Accordingly, a mixture of about 78% ADG and 22% natural gas is established via the controller.

In further embodiments of the invention, the objective of regulating the relative amounts of the primary and secondary fuels in an efficient and economical manner is alternatively enhanced by sensing, continuously or at least periodically, one or more parameters associated with the fuels or the operating characteristics of the power plant, and using the sensed value(s), via feedback to the controller, to continuously modulate or adjust the fuel flows to attain and/or maintain the desired results. In one such embodiment, the energy, or hydrogen, content of the primary fuel is monitored and serves to regulate the mixing flow of the secondary fuel. This may be done by monitoring a fuel component, such as methane, that has an equivalent energy or hydrogen content. In another similar embodiment, the energy or hydrogen content of the mixed primary and secondary fuels is monitored and serves to regulate the mixing flow of the secondary fuel. In a further embodiment, the monitored pressure, or pressure differential, of, at, or across, a power plant component serves to regulate mixing of the secondary fuel with the primary fuel. In a still further embodiment, the monitored voltage of the fuel cell assembly serves to regulate mixing of the secondary fuel with the primary fuel. In yet a further embodiment, a supplement to the foregoing embodiments results from the recognition that at reduced power operation, the equivalent hydrogen content of the primary fuel (ADG) alone may be sufficient. In that embodiment, operation of the fuel cell assembly/power plant above or below a carefully selected threshold value of its monitored power or current serves to either enable or disable the mixing of the secondary fuel with the primary fuel. To the extent compatible and not inconsistent, one or more of the foregoing control embodiments may be used in combination. Further still, the fuels may be other than, or in addition to, ADG and natural gas, and may include at least the conventional sources of hydrogen, such as hydrocarbons including but not limited to, bio-gasses, propane, butane, ethanol, methanol, other petroleum derivatives, etc.

The foregoing features and advantages of the present invention will become more apparent in light of the following detailed description of exemplary embodiments thereof as illustrated in the accompanying drawings.

BEST MODE FOR CARRYING OUT THE INVENTION

Referring to the Drawings, FIG. 1 depicts an existing fuel cell power plant having capability for using a hydrogen-containing primary fuel such as natural gas, and various alternate hydrogen-containing fuels, either alone or mixed, as determined by pre-selected settings, as previously described in the Background Art. In the main, much of the apparatus described and depicted in FIG. 1 of the Background Art is similarly used with respect to the invention to be described following, and thus, reference will be made to that structure using the reference numbers appearing in FIG. 1. Departure from that convention will be made only where necessary to emphasize and describe differences between the prior art and the present invention.

Figure 2A:
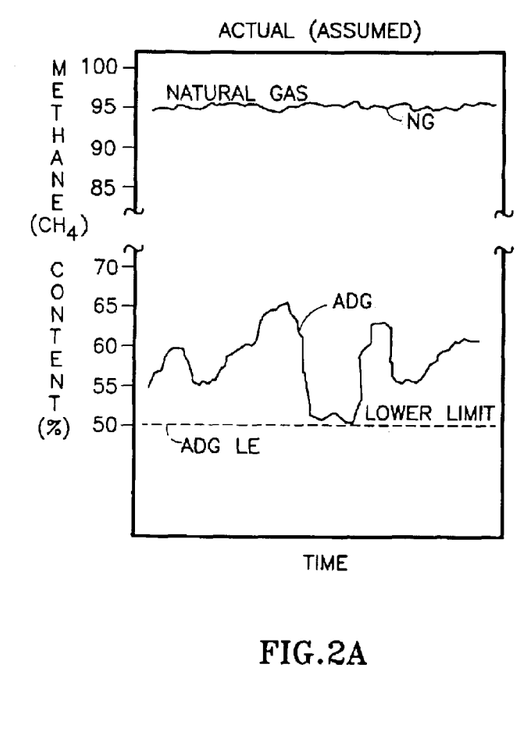
FIG. 2A graphically depicts the methane, and indirectly the equivalent hydrogen, contents and their variations with time, of a primary fuel, anaerobic digester gas, and a secondary fuel, natural gas.
Figure 2B:
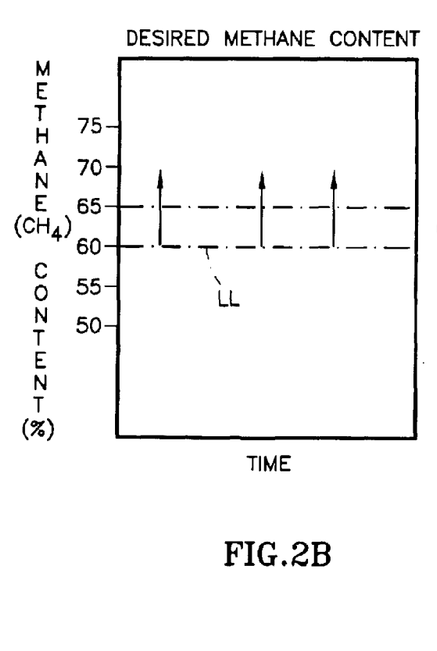
FIG. 2B graphically depicts the minimum methane (equivalent $H_2$) content of the mixed fuels permissible for satisfactory operation of the fuel cell assembly of a prior art fuel cell power plant such as depicted in FIG. 1.
Figure 2C:
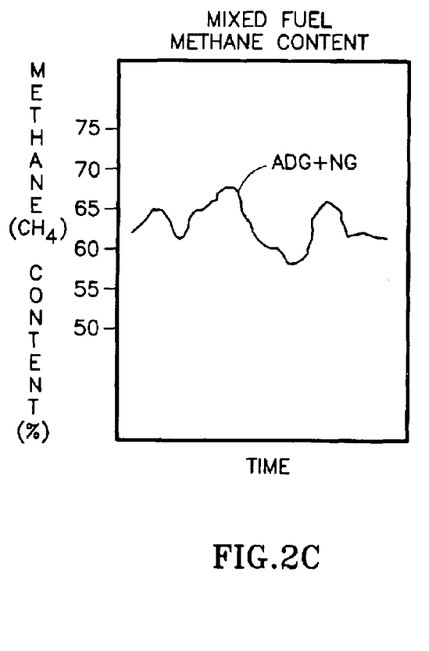
FIG. 2C graphically depicts the methane (equivalent $H_2$) content of the resulting fuel mixture when the primary and secondary fuels are mixed in accordance with the invention.

Because in many circumstances the availability and "cost" of ADG (or other similar fuels) may make it more attractive than other hydrogen-containing fuels, such as natural gas, there is incentive to make it the sole, or at least primary, fuel source for the power plant 10. The following description of the invention will be through reference to the methane content of a particular fuel, however as mentioned above, it will be understood that methane is just one good example of a hydrogen-containing compound having a significant, known hydrogen content, and that it is actually that equivalent hydrogen content that is relied upon by the FPS 16 and CSA 12. Referring collectively to FIGS. 2A–2C, and initially to FIG. 2A, there is graphically depicted plots of the assumed methane (and thus, equivalent $H_2$) content of natural gas NG and of a bio-gas, in this instance anaerobic digester gas ADG, over some time interval that may be measured in minutes, hours, or even days. It will be noted that the methane-content plot NG for natural gas reveals a relatively high and constant methane content, at about 95%. By contrast, however, the methane content of the ADG is seen to be significantly less and varies with time, ranging between about 50% and 65%. A broken line ADGLE depicts the presumed lower extreme to the methane content of the particular source of ADG. Of course, that lower extreme may be more or less for other hydrogen fuel sources.

Referring to FIG. 2B, there is graphically depicted, between the broken/dotted lines, the desired range of methane (equivalent $H_2$) content in the fuel for continuous satisfactory operation of the power plant 10. Importantly, the lower broken/dotted line LL indicates the lower limit of methane content in the fuel that is acceptable for satisfactory operation of the power plant 10. For the PC25™ power plant, that lower limit, LL, is about 60% methane content. While the range is depicted as having an upper limit of about 65%, that latter value is not critical and is illustrated more for the sake of an economic limit and to limit the carbon content. Fuels having a greater methane content are simply used in lesser amounts. It will be noted from FIG. 2A, however, that the ADG fuel source may often fail to have a methane content as great as 60%. Thus, for ADG to be used as a primary fuel, it is necessary to mix it with one or more other fuels having sufficiently greater equivalent hydrogen content to always assure that the methane (equivalent $H_2$) content of the mixed fuel is as great, or greater than, about 60%.

Assuming the primary fuel is ADG having a lower extreme methane content, ADGLE, of about 50%; and assuming the lower limit, LL, of methane content of the resultant fuel passed to the fuel processing system (FPS) 16 must be at least a known value, such as 60%, to satisfactorily operate the CSA 12; and further assuming that a secondary, or alternate, fuel has a methane content that is known, or can be accurately assumed, and is relatively constant, such as natural gas having a methane content of about 95%; then it is possible to establish a mix ratio, or percentage, of the two (or more) fuels to at least achieve the minimum methane (equivalent H2) content level, LL, required. Moreover, that mix ratio may be further selected to minimize the amount of the secondary, or alternate, fuel(s) in order to control costs and/or otherwise optimize the benefit of the blend, or mix. As noted previously, although the examples reference methane level as the equivalent energy or hydrogen measure, it will be appreciated that it may be done similarly for another fuel source in which the equivalent hydrogen content correlation is known or determinable, including for hydrogen itself.

Assuming the lower extreme methane content, ADGLE, of 50% for the primary-fuel ADG, then a certain (X) percent, or fraction, of the ADG must have mixed with it a certain other (Y) percent of the secondary fuel, natural gas, at 95% methane to achieve at a methane content of the mix that is substantially at or just greater than, 60%. To determine the values of X and Y, the 50% lower extreme methane content value of the ADG is subtracted from the 95% "constant"

methane value of the natural gas, giving the value 45. That value is the greatest difference between the two fuels, and since the actual methane value of the ADG is not known, must be presumed to be the continuing value for the ADG. For a mix of the fuels to have a methane content of about 60% and maximizing the usage of the ADG, then 0.60=X(ADG)@0.50+Y(nat. gas)@0.95. Solving for X and Y, X=(45−10)/45=35/45=0.78=78%; and Y=(45−35)/45=10/45=0.22=22%. Thus, a mix ratio of 78% ADG and 22% natural gas will yield a mixed fuel having a methane content of at least 60%. Accordingly, it will be seen that the quantity of natural gas is less than $\frac{1}{3}^{rd}$ of the total mix of fuels and indeed, is even less than 25%. It should be remembered that the ADG may at times have a methane content greater than 50%, such that at those times the mixed fuel will also have a methane content greater than 60%, as established by the 78% vs 22% ratio of the two fuels. This latter result is clearly seen in FIG. 2C, which is a graphical plot of the methane content of the mixed fuels. It will be noted that the methane content is always at least 60% or greater, and, during the intervals when the methane content of the ADG alone approached 65%, the methane in the mixed fuels may approach 78% @0.65 and 22% @0.95=0.51+0.21=72%. While this latter methane value is somewhat greater than required, it is easily managed and more importantly, it assures that the minimum methane content of the mixed fuels always satisfies the minimum equivalent hydrogen content requirements of the CSA 12.

Having established the desired quantitative relationship of secondary fuel to primary fuel based on their respective methane (equivalent $H_2$) contents and the needs of the system, it only remains for the operator to enter the respective values into the controller 18, as by a keyboard or the like. Moreover, to the extent the controller 18 is structured or programmed to view a primary fuel and a secondary fuel collectively as 100%, then it is only necessary to enter the appropriate relative value for one of the two fuels and the other will necessarily be implied. For instance, in the example above, the primary fuel may be considered 100% unless a secondary fuel is present and a relative value for it is entered, but in that latter event, if 22% (or 0.22 or 10/45) is entered for the secondary fuel, then the value for the primary fuel automatically becomes the complement, or 78%. While the aforementioned example represents one that is preferred, it will be understood that other primary and/or secondary fuels may be dealt with in a similar manner. Moreover, in the event there is more than one alternate fuel, as for example a secondary and a tertiary fuel, they may be dealt with collectively as a singular alternate (i. e. "secondary") to the primary in the manner above, however it will be necessary to establish appropriate relationships between those alternates based on economy, availability and/or other factors as will be understood by the practitioner.

Reference is now made to FIGS. 3–6, and 7 for an understanding of an alternate embodiment of the invention in which it is similarly beneficial to optimize the relative usages of a primary and one or more alternate, or secondary, fuels for satisfactory and economical operation of the CSA 12. However, rather than predicating the mixing of the fuels on worst-case assumptions of the equivalent $H_2$ content of the primary and/or the secondary, or alternate, fuels, the alternate embodiment, or embodiments, senses one or more parameters associated with the fuels and/or the operating characteristics of the power plant 10 and, via a control arrangement similar in many respects to controller 18, dynamically uses the sensed values to modulate or adjust the flows of the individual fuels to obtain a desired fuel mix. More particularly, the primary fuel is preferably a fuel having a lower "cost" than the secondary fuel, but often having a lesser equivalent hydrogen content than the secondary fuel. For reasons of economy, it is generally desirable to maximize the use of the primary fuel and minimize the use of the secondary fuel throughout the operation of the power plant 10 with multiple fuels in use. To do this effectively, it is necessary to monitor one or more parameters that correlate with the equivalent hydrogen, here methane, content of the fuel and/or with the resulting operation of the power plant as impacted by the equivalent $H_2$ content of the fuel, or fuels. In describing and illustrating these embodiments of FIGS. 3–7, reference will be made to the structure and reference numbering of FIG. 1 for simplicity. Where they are the same, or substantially the same, the same reference numbers have been used in FIGS. 3–7, and where they are only similar or analogous, the prior reference number is maintained as the last two digits of a three-digit reference number. Moreover, as with respect to the discussion of the FIGS. 2A–C embodiment, the primary fuel 22 will be presumed to be ADG and the secondary fuel 24 will be presumed to be natural gas, though it will be understood that alternatives for each that satisfy the concept and working of the invention are within the scope of the invention. Moreover, the references to methane levels is intended to be a correlated reference to the energy or hydrogen level of the fuel.

Figure 3:
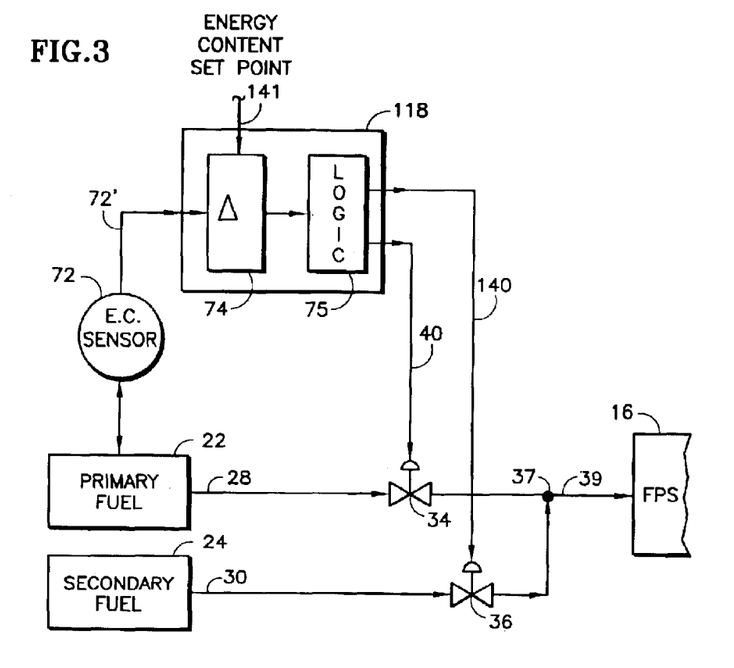
FIG. 3 is a simplified functional schematic of a control embodiment in which the monitored methane content of the primary fuel regulates mixing of the secondary fuel therewith.

Referring to FIG. 3, there is depicted a first particular embodiment of an arrangement for sensing a system parameter and using the sensed value to control the mix ratios of the multiple fuels. Specifically, the equivalent energy, or $H_2$, content of the primary fuel 22 is measured by an appropriate device or sensor, such as a suitable energy or hydrogen content analyzer or sensor (E. C.) 72. The energy content sensor 72 may be a $CH_4$ analyzer or the like, and determines the energy level of the primary fuel 22 and conveys it to the controller 118 via line 72'. The controller 118 includes appropriate circuitry or programming, represented symbolically by the Comparing function block 74 and the Logic function block 75. The Comparing function block 74 compares the measured energy content of the primary fuel with $a_n$, equivalent energy set point 141. The energy content set point 141 may be entered by the operator, as via keyboard entry or the like. Upon determining a difference, or differential, from the set point 141, that difference value may then be subjected to proportional, integral, and/or other action, and may be further conditioned by appropriate logic 75, and is provided as an output control signal from controller 118 on line 140 to control valve 36. The control valve 36 is associated with the natural gas secondary fuel supply 24, and the control signal on line 140 serves to increase or decrease the flow of the natural gas as needed to obtain a mixed gas ratio having the requisite methane, and thus equivalent $H_2$, content. Although the basic mix ratio may be predetermined in a manner similar to that associated with FIGS. 2A–3C and may be used to establish the set point 141, the use of the energy content sensor 72 enables the controller 118 to further continuously, or at least periodically, modulate the control valve 36 and thereby control the natural gas 24 flow such that it increases or decreases to maintain a nearly constant methane, and thus equivalent $H_2$, level in the mixed fuel in conduit 39. This, then, avoids some of the excursions seen in the plot of the mixed fuel methane content in FIG. 2C.

Figure 4:
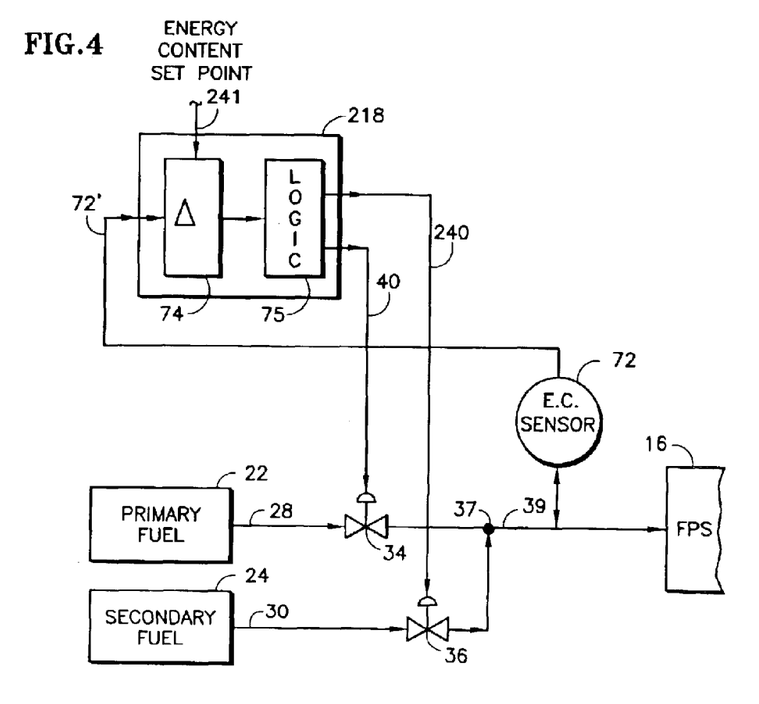
FIG. 4 is a simplified functional schematic of a control embodiment in which the monitored methane (equivalent $H_2$) content of the mixed primary and secondary fuels regulates mixing of the latter with the former.

Referring to FIG. 4, there is depicted a modest modification of the embodiment illustrated in FIG. 3. Specifically, the energy content (E. C.) sensor 72 is operative to sense the energy content of the mixed fuels in conduit 39, downstream of the mixing junction 37 where the multiple fuels are blended or mixed. As before, a line 72' conveys the energy content value(s) to a comparing function block 74 in controller 218 for comparison with $a_n$, energy content set point signal value 241. However, in the present instance, the set point 241 is pre-selected to a desired energy content for the mixed fuels, and the resulting control signal on line 240 applied to the control valve 36 serves to modulate that valve to achieve and/or maintain the fuel mix at the desired energy content level.

Figure 5:
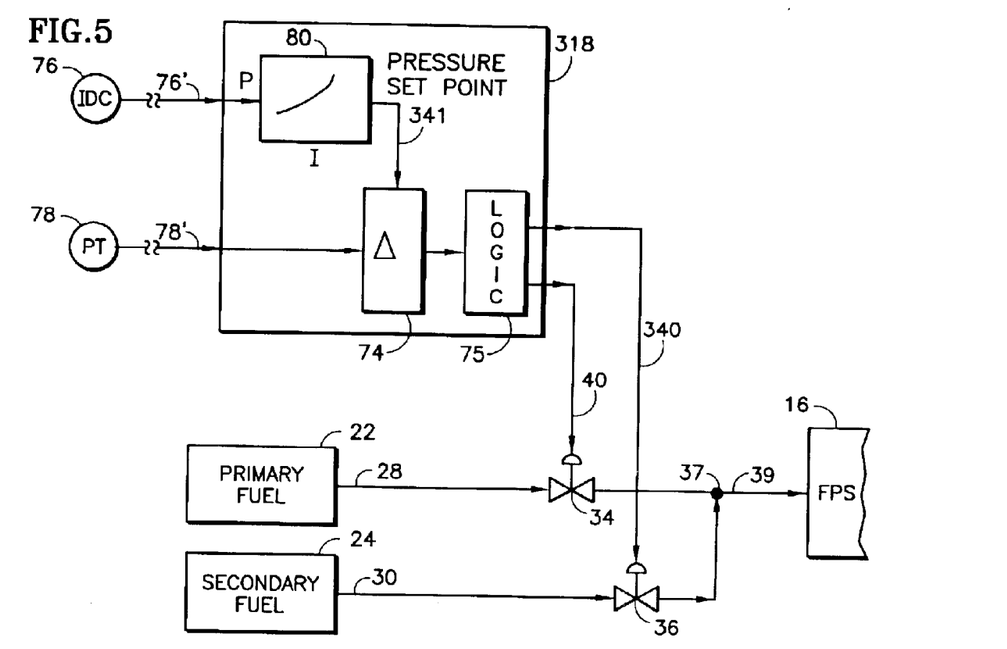
FIG. 5 is a simplified functional schematic of a control embodiment in which the monitored pressure of, or at, a power plant component serves to regulate mixing of the secondary fuel with the primary fuel.

The embodiment of FIG. 5 utilizes the characteristic of various components of power plant 10, particularly in the fuel delivery and processing section, to exhibit pressure changes as a function of changes in the equivalent $H_2$ and/or inert content of the mixed fuel. For instance, if the equivalent $H_2$ content of the ADG 22 declines, the inerts in the gas will correspondingly increase and will cause an increase in the pressure or pressure differential at or across those components of the power plant. Thus, by monitoring the pressure, or more likely the pressure differential, of, at, or across, one or more of such components, changes in the equivalent energy content may be inferred and quantified, and appropriate control action taken to increase or decrease the natural gas flow to achieve the desired equivalent $H_2$ level. In this embodiment, the controller 318 receives an input from current sensor 76 via line 76', and an input from pressure transducer 78 via line 78'. The current sensor 76 monitors the output load current of the FCA 12, and applies it to a reference pressure schedule function block 80 which, for a predefined mixed fuel equivalent $H_2$ composition, provides a correlation function between the load current IDC (as measured by current sensor 76) and a reference pressure (or pressure differential) for the component for which the pressure (or pressure differential) is measured by the PT transducer 78. In response to the measured current signal provided by sensor 76, the function block 80 provides a pressure set point signal on line 241 that is applied to the comparing function block 74. That comparing function block 74 also receives the pressure signal on line 78' provided by the pressure sensor 78, as an indication of the existing pressure, or pressure differential, of the component being monitored. Upon determining a difference between the monitored pressure signal on line 78' and the pressure set point signal on line 341, that difference value may be subjected to proportional, integral, and/or other action, may be further conditioned by logic 75, and is provided as an output control signal from controller 318 on line 340 to control valve 36. As previously, the control valve 36 is modulated to increase or decrease the relative amount of natural gas 24, and thus equivalent $H_2$, being mixed with the primary ADG fuel 22 so as to attain and/or maintain the appropriate pressure (or pressure differential) at the component being monitored.

Figure 6:
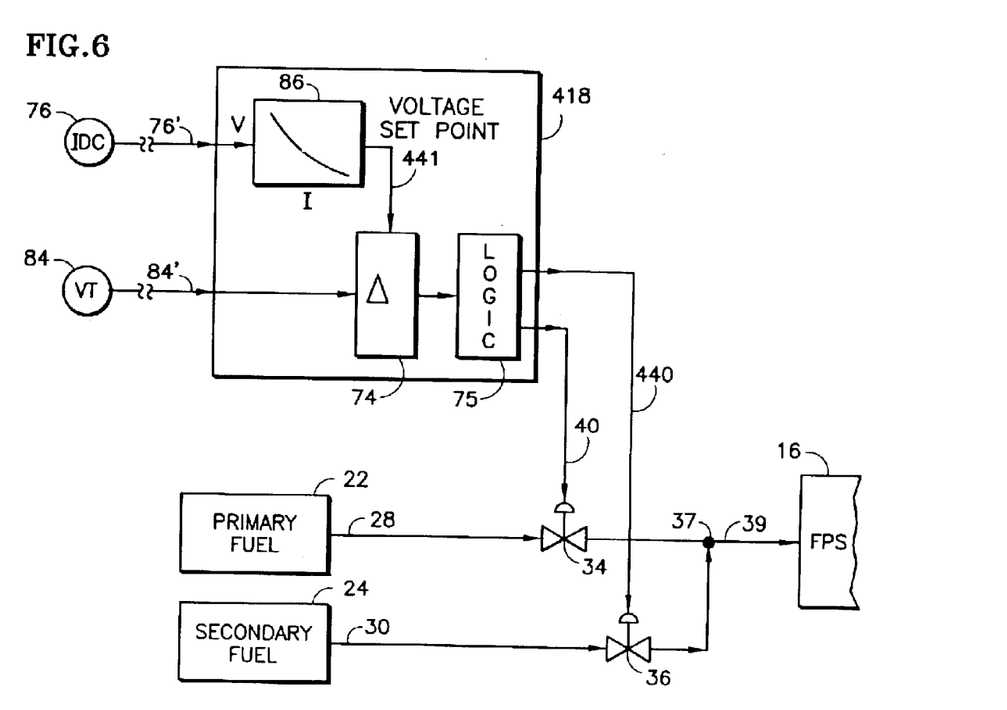
FIG. 6 is a simplified functional schematic of a control embodiment in which the monitored voltage of the fuel cell assembly serves to regulate mixing of the secondary fuel with the primary fuel.

The embodiment of FIG. 6 is similar to the FIG. 5 embodiment in many respects, with the major difference being that it is the voltage of the CSA 12, as sensed by a voltage transducer 84 and appearing on line 84', that is the sensed system parameter that is reflective of fuel energy (equivalent $H_2$) content. As previously, the load current is sensed by TDC current sensor 76 and is applied, in this instance, to a reference voltage schedule function block 86 forming part of controller 418. The function block 86, for a predefined mixed fuel equivalent $H_2$ composition, provides a correlation function between the load current IDC (as measured by current sensor 76) and a reference output voltage of the CSA 12, which is the system parameter measured by the VT transducer 84. In response to the measured current signal provided by sensor 76, the function block 86 provides a voltage set point signal on line 441 that is applied to the comparing function block 74. That comparing function block 74 also receives the voltage signal on line 84' provided by the voltage transducer VT 84, as an indication of the existing voltage of the CSA 12 being monitored. Upon determining a difference between the monitored voltage signal on line 84' and the voltage set point signal on line 341, that difference value may be subjected to proportional, integral, and/or other action, may be further conditioned by logic 75, and is provided as an output control signal from controller 418 on line 440 to control valve 36. As previously, the control valve 36 is modulated to increase or decrease the relative amount of natural gas 24, and thus equivalent $H_2$, being mixed with the primary ADG fuel 22 so as to attain and/or maintain the appropriate voltage provided by the CSA 12.

Figure 7:
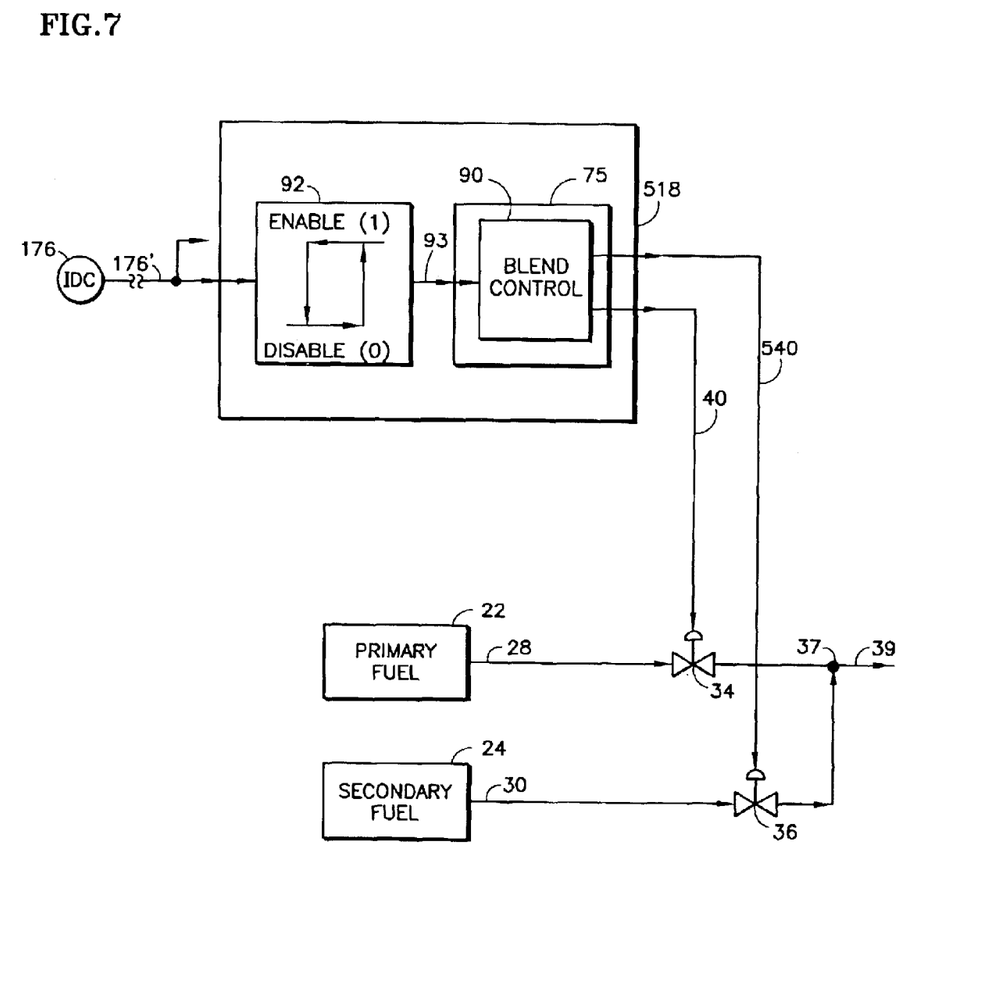
FIG. 7 is a simplified functional schematic of a control embodiment in which a monitored power or current threshold of the fuel cell assembly/power plant serves to enable or disable the mixing of the secondary fuel with the primary fuel.

Referring to FIG. 7, there is graphically and functionally depicted a control arrangement that may be an alternative to the embodiments of FIGS. 2–6, but which is preferably a supplement to them. It may be viewed as an override to the blending or mixing functions described above. Specifically, the controller 518 is depicted as including a Blend Control function block 90 that is cumulatively representative of any of the fuel blending control functions previously described with respect to the Figures, including FIGS. 1–6. The Blend Control 90, which may be a part of logic 75, is responsive to operator input and/or input from sensors to provide the control signals 40 (and 140, 240, 340, 440 of the several respective embodiments) that control the primary and secondary fuel flows via control valves 34, 36, etc., as described above. However, it may be useful to have no mixing of the secondary fuel 24 with the primary fuel 22 if and when the power or current demand on the CSA 12/power plant 10 is less than some threshold value, as for instance 50% power. In such instance of limited power output required of the CSA 12/power plant 10, the primary fuel ADG 22 may have sufficient methane (equivalent hydrogen) content, even in its worst-case circumstances, adequately fuel the CSA 12 in meeting its reduced power demand.

Accordingly, the output power or current of the CSA 12 is monitored or sensed, as by a current transducer IDC 176, which may be similar to or even the same unit as, the current transducer IDC 76 described with respect to the FIGS. 5 and 6 embodiments. The current or power value provided by current transducer IDC 76 is applied, via line 176', to an enable/disable function block 92 forming a portion of the controller 518. The enable/disable function block 92 is responsive to the sensed current or power value to provide an enabling or disabling control signal 93 in accordance with the depicted schedule. Specifically, the schedule is structured to toggle the control signal 93 to a "blend enable" state when the power or current IDC exceeds a threshold, such as 50% power, and to a "blend disable" state when the power or current is less than that, or a slightly lower, threshold. The slightly lower threshold for disabling is as the result of a small dead band incorporated in the function and minimizes "hunting" about a single threshold in the event operation lingers in that region. The signal 93 is applied to the Blend Control 90, which may be part of logic function block 75, and, in its "enable" state, enables a control signal 540 to regulate control valve 36 for mixing the secondary fuel 24 with the primary fuel 22. Conversely, when signal 93 is in its "disable" state, the resulting control signal 540 disables the control valve 36, effectively blocking flow of secondary fuel 24 and thus prevents mixing with the primary ADG fuel 22.

Although the invention has been described and illustrated with respect to the exemplary embodiments thereof, it should be understood by those skilled in the art that the foregoing and various other changes, omissions and additions may be made without departing from the spirit and scope of the invention. For instance, to the extent compatible and not inconsistent, one or more of the foregoing control embodiments may be used in combination. Still further, although the embodiments of FIGS. 3–7 were described in the context of monitoring a parameter of the primary fuel and controlling the mixing of a secondary fuel therewith, it will be appreciated that such arrangement may be reversed or even used to monitor parameters of both fuels and/or control mixing of either or both fuels. Further still, the fuels may be other than, or in addition to, ADG and natural gas, and may include various other hydrocarbons such as propane, butane, methanol, ethanol, etc., as well as other sources of hydrogen. It will be understood that the reference to methane in the illustrated examples is intended to be, either directly or indirectly, a reference to and a measure of, the equivalent energy or hydrogen content of the fuel.

What is claimed is:

1. In a fuel cell power plant (10) having a fuel cell stack assembly (CSA) (12) and a fuel delivery system (16) for providing hydrogen-rich fuel (20) to the CSA (12), the fuel delivery system (16) including fuel blending means (28, 30, 37, 39) adapted to be connected to at least a primary fuel (22) having a respective equivalent hydrogen content and a secondary fuel (24) having a respective equivalent hydrogen content for mixing at least the secondary fuel (24) with the primary fuel (22) and control means (18) for regulating the relative amounts of the primary fuel and the secondary fuel mixed to provide the hydrogen-rich fuel, the improvement in the method of controlling the mixing of the primary fuel (22) and the secondary fuel (24), comprising the step(s) of:

selecting bio-gas as the primary fuel (22); and regulating (18, 34, 36) the relative amounts of the primary fuel (22) and the secondary fuel (24) mixed so as to provide at least a minimum level (LL) of hydrogen-rich fuel having an equivalent hydrogen content sufficient for normal operation of the CSA (12).

2. The method of claim 1 wherein each fuel has a respective cost, the cost of the secondary fuel (24) being relatively greater than the cost of the primary fuel (22).

3. The method of claim 1 wherein the primary fuel (22) has a relatively lower equivalent hydrogen content than does the secondary fuel (24), and concurrently limiting the use of the secondary fuel (24) relative to the primary fuel (22).

4. The method of claim 3 wherein the equivalent hydrogen content of the secondary fuel (24) is substantially constant.

5. The method of claim 4 wherein the fuels mixed for providing the hydrogen-rich fuel (20) require at least a predetermined minimum equivalent hydrogen content (LL) when mixed in order for the CSA (12) to operate normally, the equivalent hydrogen content of the primary fuel (22) is variable within a range having a worst-case lower limit value (ADGLE) less than said predetermined minimum equivalent hydrogen content (LL) for normal operation, and including the step of adding a sufficient quantity of secondary fuel (24) to the primary fuel (22) to provide at least said predetermined minimum equivalent hydrogen content (LL) when combined.

6. The method of claim 5 wherein both the primary fuel (22) and the secondary fuel (24) have their equivalent hydrogen content in the form of methane ($CH_4$), and the primary fuel (22) has a relatively lower methane content than does the secondary fuel (24).

7. The method of claim 6 wherein the primary fuel (22) is anaerobic digester gas (ADG) and the secondary fuel (24) is natural gas, and the relative quantity of natural gas added to said ADG is constant.

8. The method of claim 7 wherein the quantity of natural gas is less than one-third that of the combined natural gas and ADG.

9. The method of claim 8 wherein the quantity of natural gas is less than 25% that of the combined natural gas and ADG.

10. The method of claim 3 wherein the secondary fuel (24) is a hydrocarbon selected from the group consisting of natural gas, methane, propane, butane, methanol, ethanol, and petroleum derivatives.

11. The method of claim 1 wherein the step of regulating (18, 34, 36) the relative amounts of the primary fuel (22) and the secondary fuel (24) comprises the steps of sensing (72, 26, 78, 84, 176) at least one parameter value (IDC, P, V, E. C.) of the operating power plant (10) related to the equivalent hydrogen content of at least the primary fuel (22), and controlling (18, 36) the relative amount of secondary fuel (24) mixed with the primary fuel (22) in response to the sensed at least one parameter value (IDC, P, V, E. C.).

12. The method of claim 11 wherein the step of controlling (18, 36) the amount of secondary fuel (24) mixed with the primary fuel (22) comprises providing a set point value (41, 141, 241, 341, 441), comparing ($\Delta$) the sensed parameter with the set point value, and controlling to that set point value.

13. The method of claim 12 wherein the step of providing a set point value (41, 141, 241, 341, 441) comprises externally presetting (41, 141, 241) the set point.

14. The method of claim 12 wherein the step of providing a set point value (41, 141, 241, 341, 441) comprises sensing (76) a parameter (IDC) related to the power output of the power plant (10) and automatically determining (80, 86) the set point as a function of the sensed parameter related to power.

15. The method of claim 11 wherein the at least one parameter value (IDC, P, V, E. C.) of the operating power plant (10) related to the energy content of at least the primary fuel (22) comprises the energy content (E. C.) of at least the primary fuel (22).

16. The method of claim 15 wherein the at least one parameter value (IDC, P, V, E. C.) of the operating power plant (10) related to the energy content of at least the primary fuel (22) comprises the energy content (E. C.) of the mixed primary and secondary fuels (22, 24).

17. The method of claim 11 wherein the at least one parameter value (IDC, P, V, E. C.) of the operating power plant (10) related to the energy content of at least the primary fuel (22) comprises the pressure (P) of, or at, a component of the power plant (10).

18. The method of claim 11 wherein the at least one parameter value (IDC, P, V, E. C.) of the operating power plant (10) related to the energy content of at least the primary fuel (22) comprises the voltage of the CSA (12).

19. The method of claim 1 including the further step of sensing (176) a parameter value (IDC) related to the power output on the operating power plant (10) and disabling the blending of the secondary fuel (24) with the primary fuel (22) when the power output demand on the operating plant is below a predetermined threshold, whereby only the primary fuel (22) is used to provide the hydrogen-rich fuel (20) to the CSA (12).

* * * * *